(No Model.)
A. B. NUCKOLS.
PLOW ATTACHMENT.
No. 371,516. Patented Oct. 11, 1887.
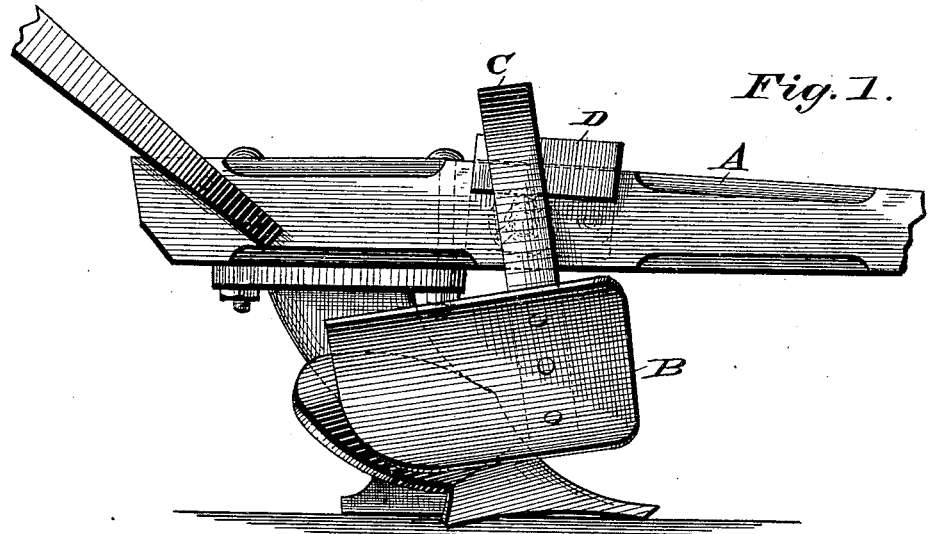
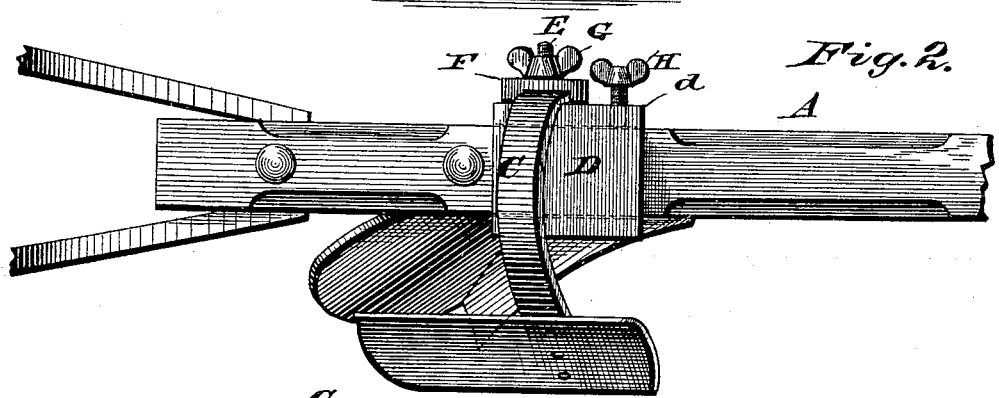
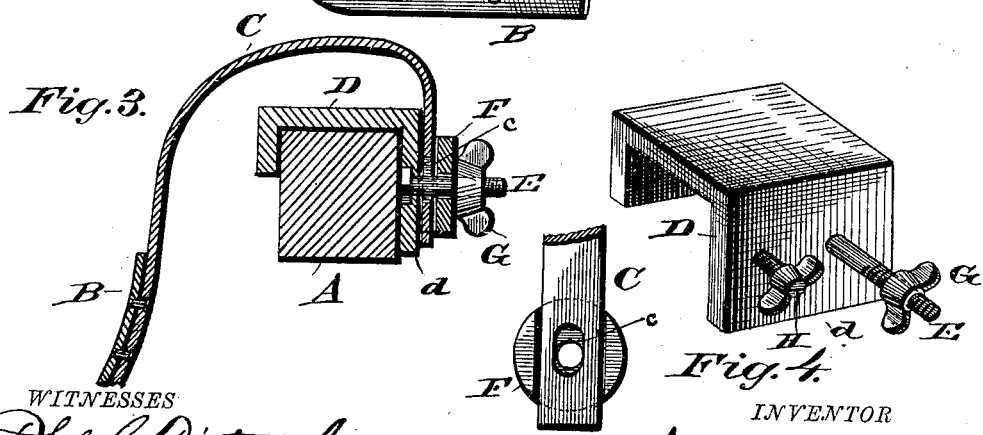
WITNESSES
Phil C. Dieterich
A. E. Sowell
INVENTOR
Aurelious B. Nuckols.
by:
J. W. Alexander
Attorney

UNITED STATES PATENT OFFICE.

AURELIOUS B. NUCKOLS, OF HAMPTON, VIRGINIA.

PLOW ATTACHMENT.

SPECIFICATION forming part of Letters Patent No. 371,516, dated October 11, 1887.

Application filed February 4, 1887. Serial No. 226,559. (No model.)

*To all whom it may concern:*

Be it known that I, AURELIOUS B. NUCKOLS, of Hampton, in the county of Elizabeth City and State of Virginia, have invented certain new and useful Improvements in Plow Attachments; and I do hereby declare that the following is a full, clear, and exact description thereof, reference being had to the accompanying drawings, and to the letters of reference marked thereon, which form part of this specification, in which—

Figure 1 is a side view of a garden-plow having my improved plant guard or fender attached. Fig. 2 is a top view of the same. Fig. 3 is a sectional view. Fig. 4 is a detail of the clamp detached.

This invention relates to improvements in agricultural or garden implements; and it has for its objects to provide a device which is applicable to different garden-plows and by which the young plants or vegetables growing by the side of the plow-furrow will be turned aside and protected from injury by the plow-share or earth turned up thereby during the passage of the plow when the soil is being cultivated.

The invention consists in the particular and novel construction of the device by which the guard-plate or fender is attached to the plow, and in certain other details, all of which will be fully understood from the following description when taken in connection with the accompanying drawings.

A designates the draft-beam of an ordinary cultivating or turn plow, and B designates a fender or shield, which is attached to said beam, as hereinafter described. This shield is adapted to be set to either side of the plow, preferably on the furrow side, in order to prevent the overturned earth from falling upon and crushing any vegetables or plants growing beside the furrow, and the shield will brush aside any overhanging portions of the plants and prevent their being injured.

The shield B is made concavo-convex in vertical cross-section, as shown, and its convex side is next the plow, so that when in use its lower edge will extend partially under the plants and more effectually prevent their being injured; and, further, by this form of shield the branches or leaves of the plants extending into the space between the rows will not be so roughly brushed aside as they would be if the shield were perfectly plane-surfaced.

The shield B is riveted to a flat metal spring-bar, C, which is of sufficient size and strength to hold the shield in position for work, and is sufficiently yielding to permit the same to move aside from or over any obstructions that it may encounter, and thereby save the shield from injury. This bar C extends upward to and over the plow-beam A, to the opposite side thereof from shield B, where it is secured to an adjustable clamp device, D, as hereinafter described.

The clamp D is of cast metal and has a top portion and two vertical side portions formed integral therewith, the clamp being of sufficient width to embrace the plow-beam A between its vertical sides. The inner side of the clamp, or the side next the shield, is only about half as deep as the outer side, *d*, as the latter part carries the devices for securing the clamp to beam A and bar C to the clamp.

E designates a bolt which is passed through the side *d* and has its head held in a countersink on the inner face thereof, as shown. The free end of bar C has a slot, *c*, as shown, and is placed upon this bolt, and a washer, F, is placed on bolt E over bar C. The washer is provided on its under face with a groove or channel corresponding in width to bar C, so that the bar can move freely on the bolt E through washer F by means of its slot.

G designates a thumb-nut or jam-nut, which is placed on bolt E, and when screwed home firmly holds the washer and bar C in position, although the bar can move freely through the washer. It is obvious that by turning the washer to different angles on bolt E the bar C and shield B can be adjusted. By having the end of bar C slotted, as described, should the shield come in contact with a clod or obstruction too large to allow it to pass by the yielding of bar C the latter can, by reason of its slot *c*, automatically rise through washer F, lifting the shield B, and thereby preventing injury.

H designates a clamping-bolt passing through a screw-threaded opening in part *d* of the clamp, and by means of which the clamp can be firmly secured to the beam A of different plows and at different positions thereon. One or more bolts, H, may be employed, as may be desired; but for ordinary work I deem one sufficient.

I am aware that spring-bars have been used to support the fenders or shields, and that various devices have been employed for securing the same on the plow-beam. Therefore I do not claim such, broadly; but What I do claim is—

1. The combination, with a suitable plow, of a concavo-convex shield, B, mounted on the lower end of curved metal spring-bar C, the upper end of which is provided with a slot, c, and secured to the plow-beam by a suitable clamp, D, having a bolt, E, passing through the slot c of the bar C, and a slotted washer, F, secured on bolt E over said bar, so that the latter can rise freely through the washer, all constructed and adapted to operate substantially as described.

2. The combination, with a plow, of a clamp, D, constructed as described, having a retaining-bolt, H, and countersunk outstanding bolt E, a curved flat metal spring-bar, C, mounted by a slot, c, in its upper end on bolt E of the clamp, a grooved washer, F, secured on bolt E outside bar C by a nut, G, but not preventing the latter playing vertically through it, and a concavo-convex fender or shield, B, secured to the lower end of bar C on the opposite side of the plow from bolt E of the clamp, and having its convex side next the plow-share, all constructed and adapted to operate substantially as and for the purpose described.

In testimony that I claim the foregoing as my own I affix my signature in presence of two witnesses.

A. B. NUCKOLS.

Witnesses:
ARTHUR S. SEGAR,
H. R. BOOKER.